(12) United States Patent
Ranta

(10) Patent No.: US 6,584,331 B2
(45) Date of Patent: Jun. 24, 2003

(54) USE OF RECEIVED SIGNAL STRENGTH INDICATOR (RSSI) AND GLOBAL POSITIONING SYSTEM (GPS) TO REDUCE POWER CONSUMPTION IN MOBILE STATION

(75) Inventor: Jukka Ranta, Turku (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/974,138

(22) Filed: Oct. 9, 2001

(65) Prior Publication Data

US 2003/0081657 A1 May 1, 2003

(51) Int. Cl.[7] .................................................. H04B 1/38
(52) U.S. Cl. ....................... 455/574; 455/343; 455/456; 455/115
(58) Field of Search ................................. 455/522, 423, 455/456, 457, 115, 343, 574, 67.1, 67.3, 231, 441, 449, 63, 65, 272, 273; 370/311, 320; 342/357.1, 357.14, 357.17

(56) References Cited

U.S. PATENT DOCUMENTS

| | | | |
|---|---|---|---|
| 5,418,537 A | 5/1995 | Bird | 342/357 |
| 5,479,479 A | 12/1995 | Braitberg et al. | 379/58 |
| 5,786,789 A | 7/1998 | Janky | 342/357 |
| 5,799,256 A | 8/1998 | Pombo et al. | 455/574 |
| 5,847,679 A | 12/1998 | Yee et al. | 342/357 |
| 5,917,851 A | 6/1999 | Jarvela et al. | 375/200 |
| 6,067,460 A | 5/2000 | Alanara et al. | 455/574 |
| 6,085,090 A * | 7/2000 | Yee et al. | 455/440 |
| 6,108,524 A | 8/2000 | Hershey et al. | 455/67.1 |
| 6,108,553 A | 8/2000 | Silventoinen et al. | 455/456 |
| 6,121,922 A | 9/2000 | Mohan | 342/357.1 |
| 6,144,336 A | 11/2000 | Preston et al. | 342/357.09 |
| 6,144,691 A | 11/2000 | Kenney | 375/130 |
| 6,215,814 B1 | 4/2001 | Ylitalo et al. | 375/148 |
| 6,269,075 B1 | 7/2001 | Tran | 370/206 |
| 6,321,091 B1 * | 11/2001 | Holland | 455/456 |
| 6,418,319 B1 * | 7/2002 | Dent | 455/456 |
| 2001/0034254 A1 | 10/2001 | Ranta | 455/574 |
| 2002/0127967 A1 | 9/2002 | Najafi | 455/3.05 |

* cited by examiner

Primary Examiner—Lester G. Kincaid
Assistant Examiner—Ronald J. Ward
(74) Attorney, Agent, or Firm—Harrington & Smith, LLP

(57) ABSTRACT

Disclosed is mobile station system (5) and a method for operating a mobile station (100) to reduce the power consumption thereof as a function of a presence or absence of motion, and as a function of a duration of a period over which motion above a motion threshold is not detected. The system includes cellular system reception circuitry and circuitry implementing a cellular system positioning function and a satellite-based positioning function (GPS). The circuitry includes a controller (120) that operates in accordance with a stored program for obtaining and combining a plurality of received signal-derived parameters of the cellular system, a position of the mobile station derived from the cellular system positioning function, and a position of the mobile station derived from the satellite-based positioning function to derive a value that is indicative of a presence or absence of motion of the mobile station. The controller compares the value to a motion threshold and, when an absence of motion is detected, the controller is responsive for reducing the power consumption of the mobile station by selectively decreasing the usage of the mobile station cellular system reception circuitry, the cellular system positioning function and the satellite-based positioning function. The received signal-derived parameters of the cellular system include received signal parameters for a currently serving cell and for at least one adjacent cell, and include one or more of a received signal strength indicator (RSSI), a signal to interference ratio (SIR), a received signal code power (RSCP), a block error rate (BLER) and a bit error rate (BER).

20 Claims, 3 Drawing Sheets

$$M(n,k) = \sum_j \{A_1(j)|f_j(R_j(n)) - f_j(R_j(n-k))| + A_2(j)\sum_i |g_j(S_j(n)) - f_j(S_j(n-k))| +$$
$$+ A_3(j)|P_j(n) - P_j(n-k)|\}$$

FIG.2A $$C(n) = \sum_i B_i M(n,i)$$

FIG.2B

USE OF RECEIVED SIGNAL STRENGTH
INDICATOR (RSSI) AND GLOBAL
POSITIONING SYSTEM (GPS) TO REDUCE
POWER CONSUMPTION IN MOBILE
STATION

TECHNICAL FIELD

These teachings relate generally to wireless communication terminals or mobile stations, such as powered cellular telephones, and more specifically relate to techniques to optimize the power consumption of portable, battery powered mobile stations.

BACKGROUND

An important aspect of the design and operation of battery powered mobile stations, such as cellular telephones and personal communicators, is the optimization of the power consumption. A direct result of the optimization of the power consumption is an increase in both the standby and talk times of the mobile station between battery recharging operations, both of which are readily experienced by and apparent to the user.

One significant power consuming operation of mobile stations is a requirement to make measurements of signals received from base stations or base sites of neighboring cells when operating within a currently serving cell. In a typical case the mobile station periodically receives a list of neighboring cells from the serving cell base station and then makes measurements, such as received signal strength measurements for radio channels from the neighboring cells. The results of these signal strength measurements are reported back to the base station of the serving cell. These signal strength measurements are useful in determining candidate cells for handoff and reselection purposes. As can be appreciated, these received signal measurement and reporting operations consume some amount of mobile station power.

It is known to reduce mobile station power consumption by detecting the motion of the mobile station using GSM (Global System for Mobile Communications) measurements, and reducing the number or frequency of adjacent cell measurements based on the detected motion. In this case the underlying rationale is that if the mobile station is stationary or moving only slowly that the previously made neighbor cell measurements most likely remain valid, and need not be re-measured.

It is also known in a dual mode wide bandwidth code division multiple access (WCDMA)/GSM mobile station to reduce the power consumption by optimizing finger (correlator) allocation in a multi-finger rake receiver, in addition to reducing the number of neighbor cell measurements based on a detected motion of the mobile station.

In U.S. Pat. No. 6,067,460 by S. Alanara, J. Ranta, H. Pirila and H. Jokinen the present inventor and others describe a mobile station that when in a DCCH camping state monitors its assigned page frame. After making RSSI and possibly also Bit Error Rate/Word Error Rate (BER/WER) measurements the mobile station monitors the rate of change of the RSSI. If the rate of change is small and remains so, the mobile station is assumed to be in a stationary state. After determining that it is stationary, the mobile station may give an audible alert and/or display a message to request the user to confirm that the mobile station is (and will remain) stationary. When in the stationary state the mobile station inhibits making neighbor channel measurements for DCCH reselection. The mobile station continues to monitor its assigned page frame within an assigned digital control channel and to measure its own channel RSSI and possibly also the BER/WER. If these values subsequently indicate that the mobile station is no longer stationary, the mobile station immediately resumes all neighbor channel measurements.

In U.S. Pat. No. 6,108,553 by M. Silventoinen, T. Rantalainen, M. Raitola and J. Ranta the present inventor and others describe a method for determining the position of a mobile station, a positioning system and a mobile station. In this approach a mobile station receives signals from at least two base stations and determines time differences of the clocks of the received signals. The mobile station sends information about the time differences to a positioning service center of the mobile communication system which then calculates the position of the mobile station on the basis of the time difference information and base station coordinates and clock information. Using this method it is possible to measure signals with signal strengths that remain below the minimum decoding level. It is also possible to measure bursts containing short training sequences to improve timing measurement accuracy and measuring speed. The time difference measurement results obtained are transmitted from the mobile station to a base station by encoding the results in a signalling channel (SACCH) burst. The method enables quick position measuring at short intervals without substantially increasing the load on the mobile station or on the air interface.

Although well-suited for their intended applications, it is desirable to provide even further power savings and power consumption optimization in those types of mobile stations that also include a power consuming Global Positioning System (GPS) reception and position location calculation capability. Previously, the power consumption of each of the cellular-based and GPS-based mobile station systems were addressed separately without any cooperation between these systems.

SUMMARY

The foregoing and other problems are overcome by methods and apparatus in accordance with embodiments of these teachings.

In accordance with these teachings a mobile station has two location determination systems that support the power saving functions of each other. These two systems are the cellular system, which may contain multiple modes such as GSM/WCDMA, and the GPS used for positioning services only. Information regarding motion of the mobile station is obtained from both systems, and the power consumption of both the cellular and GPS systems are reduced in accordance with a combination of the obtained motion-related information.

Disclosed is mobile station system and a method for operating the mobile station to reduce the power consumption thereof as a function of a presence or absence of motion, and as a function of a duration of a period over which motion above a motion threshold is not detected. The system includes cellular system reception circuitry and circuitry implementing a cellular system positioning function and a satellite-based positioning function. The circuitry includes a controller that operates in accordance with a stored program for obtaining and combining a plurality of received signal-derived parameters of the cellular system, a position of the mobile station derived from the cellular system positioning function, and a position of the mobile station derived from the satellite-based positioning function to derive a value that is indicative of a presence or absence of motion of the mobile station. The controller compares the value to a motion threshold and, when an absence of motion is detected, the controller is responsive for reducing the power consumption of the mobile station by selectively decreasing the usage of the mobile station cellular system reception circuitry, the cellular system positioning function and the satellite-based positioning function.

In a non-limiting CDMA-based cellular system embodiment the mobile station cellular system reception circuitry includes a PN code searcher and PN code fingers that are allocated in a rake receiver.

In an illustrative embodiment the received signal-derived parameters of the cellular system include received signal parameters for a currently serving cell and for at least one adjacent cell, and include one or more of a received signal strength indicator (RSSI), a signal to interference ratio (SIR), a received signal code power (RSCP), a block error rate (BLER) and a bit error rate (BER).

BRIEF DESCRIPTION OF THE DRAWINGS

The above set forth and other features of these teachings are made more apparent in the ensuing Detailed Description of the Preferred Embodiments when read in conjunction with the attached Drawings, wherein:

FIGS. 2A and 2B each show an equation that is solved by the mobile station of FIG. 1.

DETAILED DESCRIPTION OF THE PREFERRED EMBODIMENTS

Figure 1:
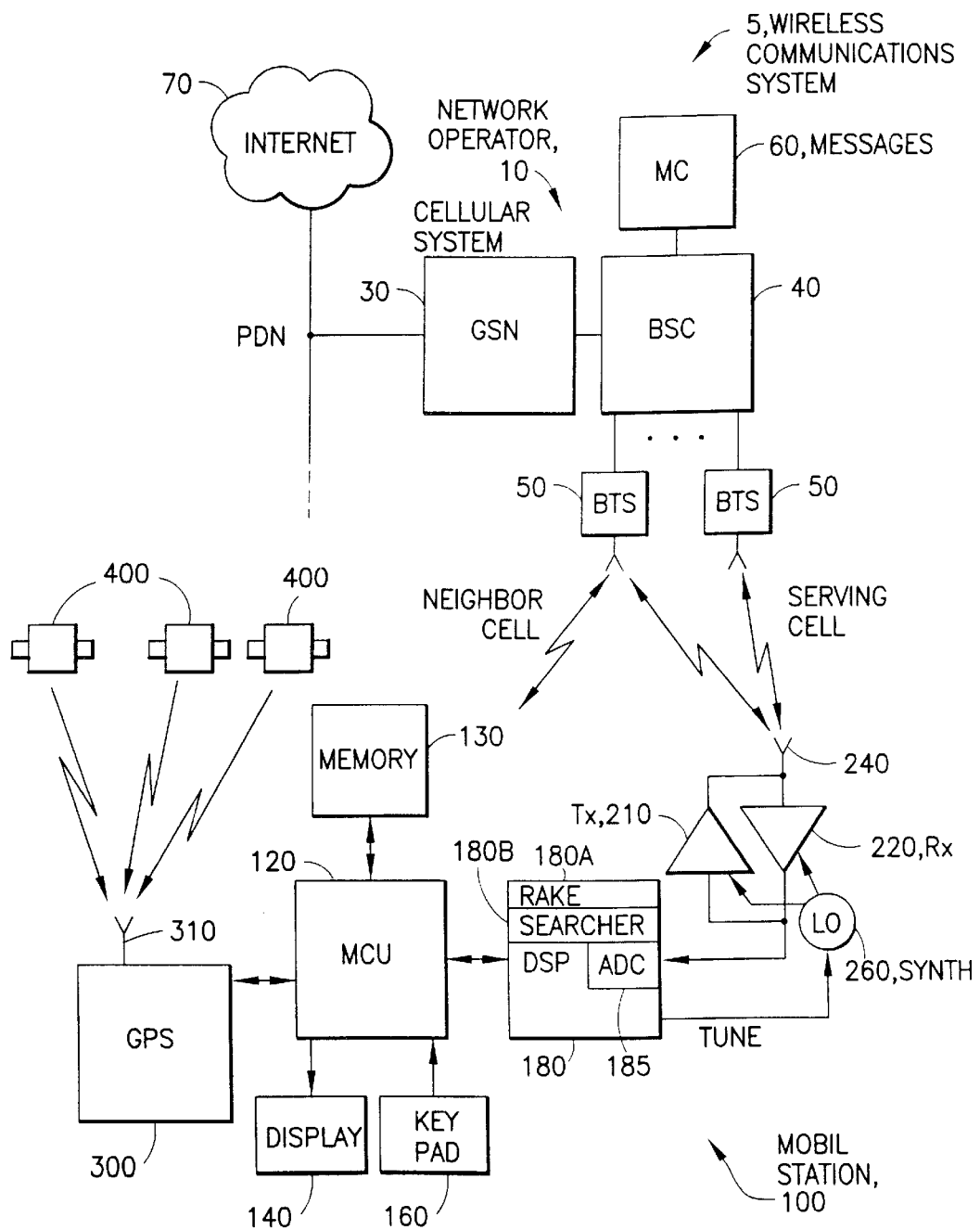
FIG. 1 is a block diagram of a wireless communication system containing a cellular system and a mobile station having a controller and a GPS subsystem that is suitable for practicing the teachings in accordance with this invention.

Referring first to FIG. 1 there is illustrated a simplified block diagram of an embodiment of a wireless communications system 5 that is suitable for practicing these teachings. The wireless communications system 5 includes at least one mobile station (MS) 100. The MS 100 may be embodied as a handheld cellular telephone, a vehicle-installed cellular telephone, a personal communication device, a personal data assistant (PDA) device having wireless communication capabilities, a wireless communication module installable within or with a computer, such as a PCMCIA or similar type of card or module that is installed during use within a portable data processor, such as a laptop or notebook computer, or even a computer that is wearable by the user. In general, the MS 100 may be any device capable of bidirectional communication with a wireless network.

FIG. 1 also shows an exemplary network operator or cellular system 10 having, for example, a GPRS Support Node (GSN) 30 for connecting to a telecommunications network, such as a Public Packet Data Network or PDN. The GPRS, or General Packet Radio Service, is a GSM phase 2+ service in which radio resources for data transfer are allocated on a per block basis, as opposed to a circuit-switched basis. The network operator 10 also includes at least one base station controller (BSC) 40, as well as a plurality of base stations or base transceiver stations (BTS) 50 that transmit in a forward or downlink direction both physical and logical channels to the mobile station 100 in accordance with the predetermined air interface standard. A reverse or uplink communication path also exists from the mobile station 100 to the network operator, and conveys mobile originated access requests and traffic.

Each BTS 50 is assumed to support a cell. The BTS 50 through which the MS 100 is currently receiving service is considered to be the serving cell BTS, while at least one other BTS 50 is assumed to be supporting a neighboring or adjacent cell from which the MS 100 is required to periodically make RF signal measurements, as was described above.

The air interface standard can conform to any standard that enables voice and/or packet data transmissions to occur to and from the mobile station 100, such as packet data transmissions enabling Internet 70 access and web page downloads. In the presently preferred embodiment of these teachings the air interface may support WCDMA operation, or Time Division Multiple Access (TDMA) operation. Multiple different types of operations may also be supported by the MS 100 (e.g., WCDMA/GSM), and may also include an advanced GSM protocol and air interface. It is assumed that the air interface of the cellular system 10 supports some type of mobile station location function, such as the well-known observed time difference (OTD) or the extended OTD (EOTD) of GSM.

Although not particularly relevant to these teachings, the cellular system 10 may also include a Message Center (MC) 60 that receives and forwards messages for the mobile stations 100. Other types of messaging service may include Supplementary Data Services and one under currently development and known as Multimedia Messaging Service (MMS), wherein image messages, video messages, audio messages, text messages, executables and the like, and combinations thereof, can be transferred between the network and the mobile station 100.

The mobile station 100 includes a controller, such as a microcontrol unit (MCU) 120 having an output coupled to an input of a display 140 and an input coupled to an output of a keyboard or keypad 160. The MCU 120 is assumed to include or be coupled to some type of a memory 130, including a read-only memory (ROM) for storing an operating program, as well as a random access memory (RAM) for temporarily storing required data, scratchpad memory, received data, data to be ransmitted and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120, in cooperation with a DSP 180 described below, to execute the software routines, layers and protocols required to implement an improved mobile station motion determination function in accordance with the teachings herein. A suitable user interface (UI) is typically also provided via display 140 and keypad 160. Although not shown, a microphone and speaker are typically provided for enabling the user to conduct voice calls in a conventional manner.

The mobile station 100 also contains a wireless section that includes the digital signal processor (DSP) 180, or equivalent high speed processor, as well as a wireless transceiver that includes a transmitter 200 and a receiver 220, both of which are coupled to an antenna 240 for communication with the cellular system operator via the serving base station 50. The DSP 180 may implement, or receive an input from, an ADC 185 used for digitizing received signal level samples of adjacent and same cell control channel transmissions, such as paging block transmissions. At least one local oscillator (LO) 260, such as a frequency synthesizer, is provided for tuning the transceiver. The receiver 220 could be a direct conversion receiver, or a heterodyne-type receiver using an Intermediate Frequency (IF). Data, such as digitized voice and/or packet data, is transmitted and received through the antenna 240.

In a CDMA embodiment, such as a WCDMA embodiment, the DSP 180 is also assumed to iniplement, or communicate with, a multi-finger rake receiver 180A and an associated pseudonoise (PN) code searcher function 180B.

Rake receivers and PN searchers are well known in the art as evidenced by, for example, U.S. Pat. No. 6,269,075, by Jean-Marie Tran, "Finger Assignment in a CDMA Rake Receiver"; U.S. Pat. No. 6,144,691, by T. Kenney, "Method and Apparatus for Synchronizing to a Direct Sequence Spread Spectrum Signal"; U.S. Pat. No. 6,215,814, by J. Ylitalo et al., "Rake Receiver"; and U.S. Pat. No. 5,917,851, by M. Jarvela et al., "Method for Allocating Rake Branches and Rake Receiver", the disclosures of which are incorporated by reference herein in their entireties.

The MS 100 also includes a GPS subsystem 300 that communicates with the MCU 120 and that provides data representing a current position of the MS 100 to the MCU 120. The GPS subsystem 300 includes an antenna 310 for receiving transmissions from individual ones of the satellites 400 of the GPS, and may operate as a largely self-contained system to calculate the current position of the MS 100 on the surface of the earth. The details of the operation of GPS systems are well-known and well-represented in the prior art, and will not be discussed in further detail herein.

Having thus described a suitable hardware platform for practicing the teachings in accordance with this invention, a description of presently preferred embodiments of these teachings are now provided.

The basic principle of operation has two major aspects. The first aspect pertains to the calculation of a motion indicator that is descriptive of an amount of motion, if any, of the MS 100, and that takes into account an amount of time that the MS 100 is motionless. The motion indicator is calculated using information from several sources. In the presently preferred embodiment these sources include the GPS 300, a cellular system-based positioning system such as the above-mentioned EOTD of GSM, and the normal received signal properties of the cellular system base stations 50 (for both serving and adjacent cells).

The second aspect of these teachings relates to the optimization of the power consumption of various systems, subsystems and operations of the MS 100 in accordance with the calculated motion indicator.

The following quantities are defined as follows:

$R_1(n)$=received signal strength indicator (RSSI) of the serving cell $R_2(n)$=signal to interference ratio (SIR) of the serving cell $R_3(n)$=received signal code power (RSCP) of the serving cell $R_4(n)$=block error rate (BLER) of the serving cell $R_5(n)$=bit error rate (BER) of the serving cell $S_1(i,n)$=received signal strength indicator (RSSI) of adjacent cell I $S_2(i,n)$=signal to interference ratio (SIR) of adjacent cell I $S_3(i,n)$=received signal code power (RSCP) of adjacent cell I $S_4(i,n)$=block error rate (BLER) of adjacent cell I $S_5(in)$=bit error rate (BER) of adjacent cell I $P_1(n)$=position vector (latitude, longitude, elevation) from the GPS 300

$P_2(n)$=position vector from the cellular system-based positioning system

Mobile station implemented techniques to determine the foregoing various parameters or metrics (e.g., RSSI, SIR, RSCP, BLER and BER) are known in the art, and a particular technique may be specified for use by the applicable air interface standard. The determination of mobile station position is also well known in the art, as is the determination of GPS position.

A motion indicator (M) is defined at moment n with delay k in accordance with the Equation 1 shown in FIG. 2A, wherein $f_j$ and $g_j$ are mapping functions that make the motion indicator differently sensitive to changes in the measured quantities at different absolute levels of the quantities, and $A_i(j)$ are constants that make the motion indicator differently sensitive to different quantities. The values of these functions and constants are preferably determined empirically by field and laboratory tests, with the goal being an optimization of the performance of the method. The values of these functions and constants may, however, be defined as identity functions and unity constants as a starting point, and thereafter refined in order to optimize the performance of the method and the overall degree of power conservation.

A combined motion indicator is then defined in accordance with the Equation 2 shown in FIG. 2B, where $B_i$ are constants preferably determined by simulations and field tests, and whose purpose is to weight the individual motion indicators M(n,k) with different coefficients.

It should be noted that the quantities $R_m(n)$, $S_m(i,n)$, and $P_m(n)$ may not exist in all types of equipment where these teachings may be used. For example, RSCP is not available in a TDMA-type terminal. The foregoing list of quantities is thus to be viewed in a general sense, and a subset of the list may be used in a practical implementation. Formally, any quantity that is not available in a certain type of terminal or equipment is defined as zero in the Equations 1 and 2.

Figure 3:
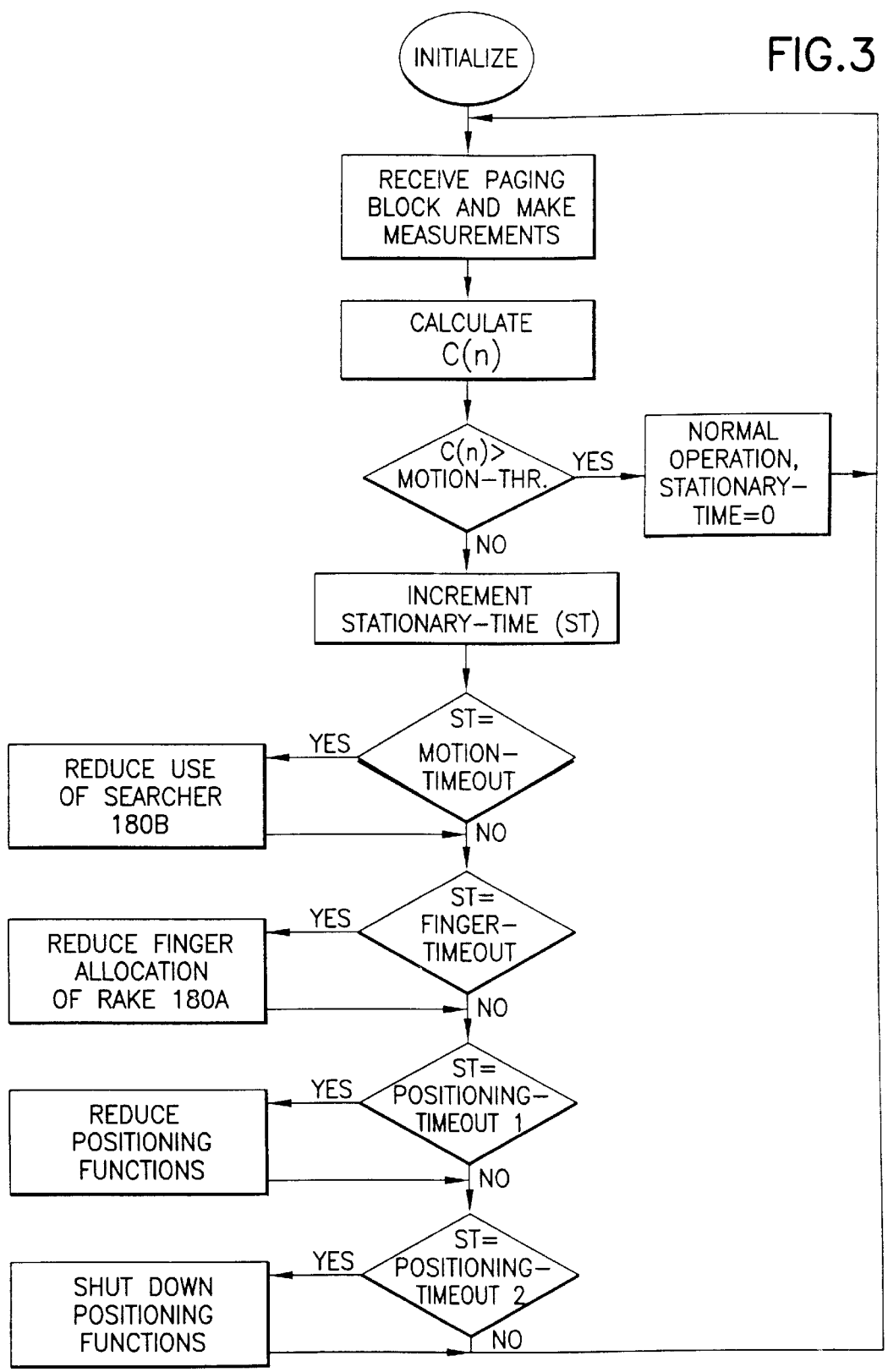
FIG. 3 is a logic flow diagram of a method executed by the mobile station controller of FIG. 1.

The power conservation algorithm operates so as to minimize the power consumption of both the GPS subsystem 300 and the cellular system 10 idle mode functions, in accordance with the following pseudocode. This example assumes a CDMA-based system using the multi-finger rake receiver 180A, PN code searcher 180B and the cellular system 10 that is assumed to transmit a paging block to the MS 100. Reference is also made to the logic flow diagram of FIG. 3.

```
//Initialization steps//
n=0;
stationary_time =0;
Set the use of the searcher 180B to SEARCHER_USAGE
   (0);
Set the finger allocation of the rake receiver 180A to
   "normal";
Set the positioning function operating mode to "normal";
LOOP FOREVER
   Wait for and receive a paging block and make the measurements;
   Calculate the combined motion indicator C(n) in accordance with Equations 1 and 2;
   IF C(n)>MOTION_THRESHOLD THEN
      Set the use of the searcher to SEARCHER_USAGE
         (0);
```

```
Set the finger allocation to "normal";
Set positioning function operating mode to "normal";
stationary_time=0; //MS 100 not stationary, normal
    operation//
ELSE
    stationary_time=stationary_time+1;
ENDIF
FOR k=1 TO N_OF_STEPS DO
    IF stationary_time=MOTION_TIMEOUT(k) THEN
        Reduce the use of the searcher 180B to
            SEARCHER_USAGE(k);
    ENDIF
    IF stationary_time=FINGER_TIMEOUT THEN
        Reduce the finger allocation of rake 180A to "mini-
            mized";
    ENDIF
    IF stationary_time=POSITIONING_TIMEOUT1
        THEN
        Set positioning function operating mode to
            "reduced";
    ENDIF
    IF stationary_time=POSITIONING_TIMEOUT2
        THEN
        Shut down the positioning functions;
    ENDIF
ENDFOR
n=n+1;
ENDLOOP
```

While simulations and field tests are preferably employed to determine the constants, the following general rules have been found to apply in any case:

MOTION_TIMEOUT(k)>MOTION_TIMEOUT(k−1)
SEARCHER_USAGE(k)<SEARCHER_USAGE(k−1)
POSITIONING_TIMEOUT1<POSITIONING_TIMEOUT2

Finger allocation "normal" contains more fingers than "minimized".

It should be noted that there will typically be small variations in C(n) when the MS 100 is stationary, and the value of C(n) becomes larger when the MS 100 begins to move. MOTION_THRESHOLD is the limit between the decision as to whether the MS 100 is stationary or is moving. MOTION_THRESHOLD is dependent on $A_i$ and $B_i$, and it may be determined as follows: a) maintain the MS 100 in various places; b) analyse the resulting distribution of C(n); and c) select MOTION_THRESHOLD as the smallest value that is smaller than C(n). This should be done over a period of time such as, at most, once an hour on average.

Typical values for MOTION_TIMEOUT(k), k=1, 2, 3, . . . , may be 10 minutes, 20, minutes, 30 minutes, . . . , i.e., the time increments are 10 minutes. Typical values for FINGER_TIMEOUT(k), k=1, 2, 3, . . . , may be 2 minutes, 4, minutes, 6 minutes, . . . , i.e., the time increments are 2 minutes. A typical value for POSITIONING_TIMEOUT1 may be 15 minutes, and a typical value for POSITIONING_TIMEOUT2 may be 1 hour.

Any or all of these values may be adjusted according to the behaviour of the MS 100 during field and other types of tests.

The positioning function "normal" operating mode refers to normal operation without additional power saving functions. The positioning function "reduced" operating mode means a minimal set of positioning functions when there is a high probability that the MS 100 is stationary. In those terrestrial positioning systems based on the cellular system 10, the position determining operations may be shut down almost totally. Timing tracking may be reduced to an amount necessary to track those changes caused by clock inaccuracies and drift. In the satellite-based GPS system, satellite tracking is necessary at all times, but the amount of tracking can be reduced as the GPS subsystem 300 can predict the position of each satellite 400 using stored orbital parameters, and from that prediction the timing of each satellite 400 can be estimated. In the "reduced" mode, both positioning systems (i.e., the terrestrial or cellular positioning system and the GPS positioning subsystem 300) output their position vectors less frequently than in the "normal" mode. After a longer period of immobility, both the cellular and the GPS positioning systems may be totally shut down.

One benefit that is realized by the practice of these teachings is the reduced usage of the searcher 180A and of the GPS subsystem 300, which are major power consumers in the idle mode. The reduction in the amount of fingers allocated for paging block reception in the rake receiver 180A is less significant than the reduction in the use of the GPS subsystem 300, but still provide a noticeable reduction in power consumption.

Advantageously, the implementation of these teachings does not require any modifications to be made to the hardware of a typical WCDMA MS 100 having a positioning service, as the power saving methods can be implemented solely through software.

While described above primarily in the context of a CDMA embodiment, those skilled in the art should realize that these teachings have wider applicability, and may be applied as well to TDMA cellular systems with suitable modifications being made to certain of the elements of Equation 1, as discussed above. Furthermore, more or less than the specific elements shown in Equation 1 may be employed. Also, the reception of a paging block per se is not mandatory, as other types of cellular system transmissions may be received and measured.

It should be apparent that the use of the GPS information, in conjunction with the information obtained relative to the cellular system, is beneficial when the GPS information is available. In general, the GPS is more reliable than other methods used to determine the motion of the MS 100 as GPS measures the position directly, while other methods use more indirect indicators of MS 100 motion. On the other hand, a GPS receiver typically consumes more power than the other methods. An important aspect of these teachings is that one may shut down the GPS subsystem 300 without compromising the quality of the other positioning services. Also, those positioning services based on the cellular base stations 50 consume more power than other indicators, which can become automatically available while executing the mandatory functions of the MS 100.

It can thus be appreciated that most if not all portable wireless communication terminals consume some power when performing unnecessary functions. Most specifically, the MS 100 is designed to execute various functions in order to maintain the connection to cellular system via the base stations 50 when in motion (e.g., handoff and related signal measurement functions). However, the power consumed in performing many of these functions can be wasted during those periods while the MS 100 is stationary. As the conventional MS 100 Idle mode functions are normally power efficient, it would become counter-productive to add new (power consuming) measurements to determine whether the MS 100 is in motion. The teachings of this invention therefore employ a group of parameters that are present in any case within the MS 100 when executing mandatory or otherwise necessary functions, and uses these parameters in a novel manner to determine whether the MS 100 is in motion or whether it is stationary. These teachings supplement the use of the MS 100 derived cellular system-related parameters with information obtained from the GPS subsystem 300, and thereby provides a more robust and improved motion detection system, enabling increased power savings.

While these teachings have been particularly shown and described with respect to preferred embodiments thereof, it will be understood by those skilled in the art that changes in form and details may be made therein without departing from the scope and spirit of these teachings.

What is claimed is:

1. A method for reducing power consumption of a mobile station, comprising:

combining a plurality of received signal-derived parameters of a cellular system, a position of the mobile station derived from a cellular system positioning function, and a position of the mobile station derived from a satellite-based positioning function to obtain a value that is indicative of a presence or absence of motion of the mobile station;

comparing the value to a motion threshold; and when an absence of motion is detected, reducing the power consumption of the mobile station by selectively decreasing the usage of mobile station cellular system functions, the cellular system positioning function and the satellite-based positioning function.

2. A method as in claim 1, wherein the mobile station cellular system functions include the operation of a PN code searcher in a CDMA-based cellular system.

3. A method as in claim 1, wherein the mobile station cellular system functions include a number of PN code fingers allocated in a rake receiver in a CDMA-based cellular system.

4. A method as in claim 1, wherein the detected absence of motion is tracked over time, and wherein the power consumption is reduced further as the mobile station remains stationary for a longer period of time.

5. A method as in claim 1, wherein the received signal-derived parameters of the cellular system comprise received signal parameters for a currently serving cell.

6. A method as in claim 5, wherein the received signal parameters comprise a received signal strength indicator (RSSI).

7. A method as in claim 5, wherein the received signal parameters comprise a signal to interference ratio (SIR).

8. A method as in claim 5, wherein the received signal parameters comprise a received signal code power (RSCP).

9. A method as in claim 5, wherein the received signal parameters comprise a block error rate (BLER).

10. A method as in claim 5, wherein the received signal parameters comprise a bit error rate (BER).

11. A method as in claim 1, wherein the received signal-derived parameters of the cellular system comprise received signal parameters for an adjacent cell.

12. A method as in claim 11, wherein the received signal parameters comprise a received signal strength indicator (RSSI).

13. A method as in claim 11, wherein the received signal parameters comprise a signal to interference ratio (SIR).

14. A method as in claim 11, wherein the received signal parameters comprise a received signal code power (RSCP).

15. A method as in claim 11, wherein the received signal parameters comprise a block error rate (BLER).

16. A method as in claim 11, wherein the received signal parameters comprise a bit error rate (BER).

17. A mobile station comprising cellular system reception circuitry and circuitry implementing a cellular system positioning function and a satellite-based positioning function, said circuitry comprising a controller operating in accordance with a stored program for obtaining and combining a plurality of received signal-derived parameters of the cellular system, a position of the mobile station derived from the cellular system positioning function, and a position of the mobile station derived from the satellite-based positioning function to derive a value that is indicative of a presence or absence of motion of the mobile station, for comparing the value to a motion threshold and, when an absence of motion is detected, said controller being responsive for reducing power consumption of the mobile station by selectively decreasing usage of the mobile station cellular system reception circuitry, the cellular system positioning function and the satellite-based positioning function.

18. A system as in claim 17, wherein the mobile station cellular system functions include the operation of a PN code searcher and a number of PN code fingers allocated in a rake receiver in a CDMA-based cellular system.

19. A system as in claim 17, wherein said controller tracks the absence of motion over time, and reduces the power consumption further as the mobile station remains stationary for a longer period of time.

20. A system as in claim 17, wherein the received signal-derived parameters of the cellular system comprise received signal parameters for a currently serving cell and for at least one adjacent cell, and comprise one or more of a received signal strength indicator (RSSI), a signal to interference ratio (SIR), a received signal code power (RSCP), a block error rate (BLER) and a bit error rate (BER).

* * * * *